(12) United States Patent
Wei et al.

(10) Patent No.: US 9,405,353 B2
(45) Date of Patent: Aug. 2, 2016

(54) METHOD AND APPARATUS FOR CONTROLLING CENTRAL PROCESSING UNIT

(71) Applicant: Huawei Device Co., LTD, Shenzhen (CN)

(72) Inventors: Konggang Wei, Shenzhen (CN); Yuhua Guo, Shanghai (CN); Yu Peng, Shanghai (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 257 days.

(21) Appl. No.: 14/138,029

(22) Filed: Dec. 21, 2013

(65) Prior Publication Data

US 2014/0108838 A1   Apr. 17, 2014

Related U.S. Application Data

(63) Continuation of application No. PCT/CN2012/080765, filed on Aug. 30, 2012.

(51) Int. Cl.

| G06F 1/00 | (2006.01) |
|---|---|
| G06F 9/46 | (2006.01) |
| G06F 11/00 | (2006.01) |
| G06F 1/32 | (2006.01) |
| G06F 9/50 | (2006.01) |
| G06F 11/34 | (2006.01) |

(52) U.S. Cl.
CPC .............. *G06F 1/324* (2013.01); *G06F 1/3206* (2013.01); *G06F 9/505* (2013.01); *G06F 9/50* (2013.01); *G06F 9/5094* (2013.01); *G06F 11/3409* (2013.01); *G06F 11/3433* (2013.01); *Y02B 60/1217* (2013.01)

(58) Field of Classification Search
CPC ......... G06F 1/324; G06F 9/50; G06F 9/5094; G06F 9/505; G06F 11/3409; G06F 1/3206; G06F 11/3433
USPC ................... 713/322; 718/104, 105; 714/47.1
See application file for complete search history.

(56) References Cited

U.S. PATENT DOCUMENTS

| 6,076,171 | A | 6/2000 | Kawata |
|---|---|---|---|
| 7,111,179 | B1 * | 9/2006 | Girson ................... G06F 1/3203 320/130 |
| 7,506,189 | B1 * | 3/2009 | Lee ........................ G06F 1/3203 713/300 |
| 2001/0044909 | A1 | 11/2001 | Oh et al. |
| 2002/0133729 | A1 | 9/2002 | Therien et al. |
| 2003/0115495 | A1 | 6/2003 | Rawson |
| 2004/0073826 | A1 | 4/2004 | Yamashita et al. |

(Continued)

FOREIGN PATENT DOCUMENTS

| CN | 1567180 A | 1/2005 |
|---|---|---|
| CN | 101414268 A | 4/2009 |

(Continued)

*Primary Examiner* — Ji H Bae
(74) *Attorney, Agent, or Firm* — Slater Matsil, LLP

(57) ABSTRACT

The present invention discloses a method for controlling a central processing unit CPU. A usage and a working frequency of a working CPU is obtained. When the usage is greater than a usage threshold, it is determined whether the working frequency is smaller than a first frequency. The working frequency as the first frequency is determined when the working frequency is smaller than the first frequency. The first frequency is smaller than a maximum frequency of the CPU.

19 Claims, 7 Drawing Sheets

(56) References Cited

U.S. PATENT DOCUMENTS

| | | |
|---|---|---|
| 2005/0125705 A1 | 6/2005 | Cheng et al. |
| 2006/0230304 A1 | 10/2006 | Sanada |
| 2007/0016815 A1 | 1/2007 | Cooper et al. |
| 2007/0168055 A1 | 7/2007 | Hsu et al. |
| 2008/0010521 A1* | 1/2008 | Goodrum ............ G06F 11/3062 714/22 |
| 2008/0036613 A1* | 2/2008 | Gaskins ................. G06F 1/206 340/584 |
| 2008/0307240 A1* | 12/2008 | Dahan ....................... G06F 1/06 713/320 |
| 2010/0037080 A1 | 2/2010 | Kawashima et al. |
| 2010/0299545 A1* | 11/2010 | Lyu ....................... G06F 1/3203 713/322 |
| 2011/0314312 A1* | 12/2011 | Naffziger ............. G06F 1/3203 713/323 |
| 2013/0097443 A1* | 4/2013 | Li ........................ G06F 1/3206 713/322 |
| 2013/0179710 A1 | 7/2013 | Chang et al. |
| 2013/0268787 A1 | 10/2013 | Koo |
| 2014/0380076 A1* | 12/2014 | Weissmann ............. G06F 1/324 713/323 |

FOREIGN PATENT DOCUMENTS

| | | |
|---|---|---|
| CN | 101576768 A | 11/2009 |
| CN | 101853066 A | 10/2010 |
| CN | 102004543 A | 4/2011 |
| CN | 102566739 A | 7/2012 |
| EP | 2372962 A1 | 10/2011 |
| JP | 10268963 A | 10/1998 |
| JP | 200438291 A | 2/2004 |
| JP | 200877563 A | 4/2008 |
| JP | 2008217628 A | 9/2008 |
| JP | 2009230670 A | 10/2009 |
| JP | 201039791 A | 2/2010 |
| JP | 2012150668 A | 8/2012 |
| TW | 200519573 A | 6/2005 |
| WO | 2005062156 A1 | 7/2005 |

\* cited by examiner

METHOD AND APPARATUS FOR CONTROLLING CENTRAL PROCESSING UNIT

This application is a continuation of International Application No. PCT/CN2012/080765, filed on Aug. 30, 2012, which is hereby incorporated by reference in its entirety.

TECHNICAL FIELD

The present invention relates to the field of communications, and in particular, to a method and an apparatus for controlling a central processing unit.

BACKGROUND

With the continuous increase of computing requirements, particularly in mobile computing field, a processor is developing towards a direction of a high-frequency multi-core processor, which has a greatly increased parallel processing capability in unit time, and meanwhile, brings about a relatively great power consumption burden. Reducing an ineffective power consumption problem of the processor is of great significance for a computing system, especially for a mobile handheld computing device.

The prior art proposes a technical solution, where once a CPU usage is greater than a usage threshold, a CPU frequency is set to a maximum frequency. However, in this frequency adjustment manner, a CPU is enabled to always work at the maximum frequency after the CPU usage is greater than the usage threshold, which causes unnecessary power waste of the CPU.

SUMMARY OF THE INVENTION

Embodiments of the present invention provide a method and an apparatus for controlling a central processing unit, which may reduce CPU power consumption when a CPU usage is greater than a usage threshold during frequency adjustment.

According to a first aspect of the present invention, a method can be used for controlling a central processing unit CPU. A usage and a working frequency of a working CPU is obtained. When the usage is greater than a usage threshold, it is determined whether the working frequency is smaller than a first frequency. The working frequency is determined as the first frequency when the working frequency is smaller than the first frequency. The first frequency is smaller than a maximum frequency of the CPU.

In a first possible implementation manner of the first aspect, the method further includes, when the working frequency is greater than or equal to the first frequency, it is determined whether the working frequency is smaller than or equal to a second frequency. The second frequency is greater than the first frequency and smaller than the maximum frequency. The working frequency is determined as the second frequency when the working frequency is smaller than or equal to the second frequency.

In combination with the first possible implementation manner of the first aspect, in a second possible implementation manner, determining that the working frequency as the second frequency when the working frequency is smaller than or equal to the second frequency includes determining the working frequency as the second frequency when the working frequency is smaller than or equal to the second frequency and a circulation keeping count value is smaller than a circulation keeping count threshold.

In combination with the second possible implementation manner of the first aspect, in a third possible implementation manner, the method further includes adding 1 to the circulation keeping count value.

In combination with the first possible implementation manner of the first aspect, or the second possible implementation manner of the first aspect, or the third possible implementation manner of the first aspect, in a fourth possible implementation manner, the method further includes determining the working frequency as a third frequency when the working frequency is greater than the second frequency, where the third frequency is equal to the maximum frequency.

In combination with the second possible implementation manner of the first aspect, or the third possible implementation manner of the first aspect, or the fourth possible implementation manner of the first aspect, in a fifth possible implementation manner, the method further includes determining the working frequency as the maximum frequency when the circulation keeping count value is greater than or equal to the circulation keeping count threshold.

In combination with the second possible implementation manner of the first aspect, or the third possible implementation manner of the first aspect, or the fourth possible implementation manner of the first aspect, or the fifth possible implementation manner of the first aspect, in a sixth possible implementation manner, the method further includes clearing the circulation keeping count value when the usage is greater than the usage threshold and the working frequency is smaller than or equal to the first frequency.

In combination with the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, in a seventh possible implementation manner, the method further includes, when the usage is smaller than or equal to the usage threshold, obtaining a product of the usage and the working frequency, determining the working frequency as a frequency value closest to the product, and clearing the circulation keeping count value.

In an eighth possible implementation manner of the first aspect, the method further includes determining the working frequency as the maximum frequency when the working frequency is greater than or equal to the first frequency.

In combination with the first aspect, or the eighth possible implementation manner of the first aspect, in a ninth possible implementation manner, the determining the working frequency as the first frequency when the working frequency is smaller than the first frequency specifically is determining the working frequency as the first frequency when the working frequency is smaller than the first frequency and a circulation keeping count value is smaller than a circulation keeping count threshold.

In combination with the ninth possible implementation manner of the first aspect, in a tenth possible implementation manner, the method further includes adding 1 to the circulation keeping count value.

In combination with the ninth possible implementation manner of the first aspect, or the tenth possible implementation manner of the first aspect, in an eleventh possible implementation manner, the method further includes determining the working frequency as the maximum frequency when the circulation keeping count value is greater than or equal to the circulation keeping count threshold.

In combination with the ninth possible implementation manner of the first aspect, or the tenth possible implementation manner of the first aspect, or the eleventh possible implementation manner of the first aspect, in a twelfth possible implementation manner, the method further includes, when the usage is smaller than or equal to the usage threshold, obtaining a product of the usage and the working frequency, determining the working frequency as a frequency value closest to the product, and clearing the circulation keeping count value.

In combination with the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, or the eighth possible implementation manner of the first aspect, or the ninth possible implementation manner of the first aspect, or the tenth possible implementation manner of the first aspect, or the eleventh possible implementation manner of the first aspect, or the twelfth possible implementation manner of the first aspect, in a thirteenth possible implementation manner, steps of the method are executed when timing of a timer corresponding to the CPU expires.

In combination with the thirteenth possible implementation manner of the first aspect, in a fourteenth possible implementation manner, the method further includes: stopping, by the timer, timing when a system is idle.

In combination with the thirteenth possible implementation manner of the first aspect, or the fourteenth possible implementation manner of the first aspect, in a fifteenth possible implementation manner, the method further includes: starting, by the timer, timing when the system exits idle.

In combination with the thirteenth possible implementation manner of the first aspect, or the fourteenth possible implementation manner of the first aspect, or the fifteenth possible implementation manner of the first aspect, in a sixteenth possible implementation manner, the method further includes stopping, by the timer, timing if working frequencies which correspond to the timer and are obtained when timing of the timer expires successively are all the maximum frequency, and the number of times that the working frequencies are all the maximum frequency is just greater than a threshold of the number of periods in which the maximum frequency lasts.

In combination with the sixteenth possible implementation manner of the first aspect, in a seventeenth possible implementation manner, the threshold of the number of the periods in which the maximum frequency lasts is:

(start CPU power consumption sensitive factor threshold×open core sampling space)/(usage threshold×frequency weight), where the frequency weight is a first weight.

The number of times that the working frequencies are all the maximum frequency is just greater than a threshold of the number of periods in which the maximum frequency lasts is the number of times that the working frequencies are all the maximum frequency is the threshold of the number of the periods in which the maximum frequency lasts plus 1.

In combination with the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, or the eighth possible implementation manner of the first aspect, or the ninth possible implementation manner of the first aspect, or the tenth possible implementation manner of the first aspect, or the eleventh possible implementation manner of the first aspect, or the twelfth possible implementation manner of the first aspect, or the thirteenth possible implementation manner of the first aspect, or the fourteenth possible implementation manner of the first aspect, or the fifteenth possible implementation manner of the first aspect, or the sixteenth possible implementation manner of the first aspect, or the seventeenth possible implementation manner of the first aspect, in an eighteenth possible implementation manner, the first frequency is a frequency corresponding to an inflection point of a current-frequency curve.

In combination with the eighteenth possible implementation manner of the first aspect, in a nineteenth possible implementation manner, in the current-frequency curve, a first slope is smaller than a second slope and the first slope is a slope of a straight line formed by measurement points whose frequencies are lower than the frequency corresponding to the inflection point. The second slope is a slope of a straight line formed by measurement points whose frequencies are higher than the frequency corresponding to the inflection point.

In combination with the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, or the eighth possible implementation manner of the first aspect, or the ninth possible implementation manner of the first aspect, or the tenth possible implementation manner of the first aspect, or the eleventh possible implementation manner of the first aspect, or the twelfth possible implementation manner of the first aspect, or the thirteenth possible implementation manner of the first aspect, or the fourteenth possible implementation manner of the first aspect, or the fifteenth possible implementation manner of the first aspect, or the sixteenth possible implementation manner of the first aspect, or the seventeenth possible implementation manner of the first aspect, or the eighteenth possible implementation manner of the first aspect, or the nineteenth possible implementation manner of the first aspect, in a twentieth possible implementation manner, the second frequency is an average value of the first frequency and the maximum frequency.

According to a second aspect of the present invention, a terminal includes a processor, where the processor is configured to obtain a usage and a working frequency of a working CPU, when the usage is greater than a usage threshold, determine whether the working frequency is smaller than a first frequency and to determine the working frequency as the first frequency when the working frequency is smaller than the first frequency. The first frequency is smaller than a maximum frequency of the CPU.

In a first possible implementation manner of the second aspect, the processor is further configured to, when the working frequency is greater than or equal to the first frequency, determine whether the working frequency is smaller than or equal to a second frequency. The second frequency is greater than the first frequency and smaller than the maximum frequency. The processor is also configured to determine the working frequency as the second frequency when the working frequency is smaller than or equal to the second frequency.

In combination with the first possible implementation manner of the second aspect, in a second possible implementation manner, the processor determines the working frequency as the second frequency when the working frequency is smaller than or equal to the second frequency, which includes determining the working frequency as the second frequency when the working frequency is smaller than or equal to the second frequency and a circulation keeping count value is smaller than a circulation keeping count threshold.

In combination with the second possible implementation manner of the second aspect, in a third possible implementation manner, the processor is further configured to add 1 to the circulation keeping count value.

In combination with the first possible implementation manner of the second aspect, or the second possible implementation manner of the second aspect, or the third possible implementation manner of the second aspect, in a fourth possible implementation manner, the processor is further configured to determine the working frequency as a third frequency when the working frequency is greater than the second frequency, where the third frequency is equal to the maximum frequency.

In combination with the second possible implementation manner of the second aspect, or the third possible implementation manner of the second aspect, or the fourth possible implementation manner of the second aspect, in a fifth possible implementation manner, the processor is further configured to determine the working frequency as the maximum frequency when the circulation keeping count value is greater than or equal to the circulation keeping count threshold.

In combination with the second possible implementation manner of the second aspect, or the third possible implementation manner of the second aspect, or the fourth possible implementation manner of the second aspect, or the fifth possible implementation manner of the second aspect, in a sixth possible implementation manner, the processor is further configured to clear the circulation keeping count value when the usage is greater than the usage threshold and the working frequency is smaller than or equal to the first frequency.

In combination with the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the sixth possible implementation manner of the second aspect, in a seventh possible implementation manner, the processor is further configured to when the usage is smaller than or equal to the usage threshold, obtain a product of the usage and the working frequency, determine the working frequency as a frequency value closest to the product, and clear the circulation keeping count value.

In an eighth possible implementation manner of the second aspect, the processor is further configured to determine the working frequency as the maximum frequency when the working frequency is greater than or equal to the first frequency.

In combination with the second aspect, or the eighth possible implementation manner of the second aspect, in a ninth possible implementation manner, the processor determines the working frequency as the first frequency when the working frequency is smaller than the first frequency, which specifically is determining the working frequency as the first frequency when the working frequency is smaller than the first frequency and a circulation keeping count value is smaller than a circulation keeping count threshold.

In combination with the ninth possible implementation manner of the second aspect, in a tenth possible implementation manner, the processor is further configured to add 1 to the circulation keeping count value.

In combination with the ninth possible implementation manner of the second aspect, or the tenth possible implementation manner of the second aspect, in an eleventh possible implementation manner, the processor is further configured to determine the working frequency as the maximum frequency when the circulation keeping count value is greater than or equal to the circulation keeping count threshold.

In combination with the ninth possible implementation manner of the second aspect, or the tenth possible implementation manner of the second aspect, or the eleventh possible implementation manner of the second aspect, in a twelfth possible implementation manner, the processor is further configured to when the usage is smaller than or equal to the usage threshold, obtain a product of the usage and the working frequency, determine the working frequency as a frequency value closest to the product, and clear the circulation keeping count value.

In combination with the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the sixth possible implementation manner of the second aspect, or the seventh possible implementation manner of the second aspect, or the eighth possible implementation manner of the second aspect, or the ninth possible implementation manner of the second aspect, or the tenth possible implementation manner of the second aspect, or the eleventh possible implementation manner of the second aspect, or the twelfth possible implementation manner of the second aspect, in a thirteenth possible implementation manner, the processor is further configured to execute steps of the method when timing of a timer corresponding to the CPU expires.

In combination with the thirteenth possible implementation manner of the second aspect, in a fourteenth possible implementation manner, the processor is further configured to control the timer to stop timing when a system is idle.

In combination with the thirteenth possible implementation manner of the second aspect, or the fourteenth possible implementation manner of the second aspect, in a fifteenth possible implementation manner, the processor is further configured to control the timer to start timing when the system exits idle.

In combination with the thirteenth possible implementation manner of the second aspect, or the fourteenth possible implementation manner of the second aspect, or the fifteenth possible implementation manner of the second aspect, in a sixteenth possible implementation manner, the processor is further configured to control the timer to stop timing if working frequencies which correspond to the timer and are obtained when timing of the timer expires successively are all the maximum frequency, and the number of times that the working frequencies are all the maximum frequency is just greater than a threshold of the number of periods in which the maximum frequency lasts.

In combination with the sixteenth possible implementation manner of the second aspect, in a seventeenth possible implementation manner, the threshold of the number of the periods in which the maximum frequency lasts is:

> (start CPU power consumption sensitive factor threshold×open core sampling space)/(usage threshold×frequency weight), where the frequency weight is a first weight.

The number of times that the working frequencies are all the maximum frequency is just greater than a threshold of the number of periods in which the maximum frequency lasts is the number of times that the working frequencies are all the maximum frequency is the threshold of the number of the periods in which the maximum frequency lasts plus 1.

In combination with the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the sixth possible implementation manner of the second aspect, or the seventh possible implementation manner of the second aspect, or the eighth possible implementation manner of the second aspect, or the ninth possible implementation manner of the second aspect, or the tenth possible implementation manner of the second aspect, or the eleventh possible implementation manner of the second aspect, or the twelfth possible implementation manner of the second aspect, or the thirteenth possible implementation manner of the second aspect, or the fourteenth possible implementation manner of the second aspect, or the fifteenth possible implementation manner of the second aspect, or the sixteenth possible implementation manner of the second aspect, or the seventeenth possible implementation manner of the second aspect, in an eighteenth possible implementation manner, the first frequency is a frequency corresponding to an inflection point of a current-frequency curve.

In combination with the eighteenth possible implementation manner of the second aspect, in a nineteenth possible implementation manner, in the current-frequency curve, a first slope is smaller than a second slope. The first slope is a slope of a straight line formed by measurement points whose frequencies are lower than the frequency corresponding to the inflection point The second slope is a slope of a straight line formed by measurement points whose frequencies are higher than the frequency corresponding to the inflection point.

In combination with the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the sixth possible implementation manner of the second aspect, or the seventh possible implementation manner of the second aspect, or the eighth possible implementation manner of the second aspect, or the ninth possible implementation manner of the second aspect, or the tenth possible implementation manner of the second aspect, or the eleventh possible implementation manner of the second aspect, or the twelfth possible implementation manner of the second aspect, or the thirteenth possible implementation manner of the second aspect, or the fourteenth possible implementation manner of the second aspect, or the fifteenth possible implementation manner of the second aspect, or the sixteenth possible implementation manner of the second aspect, or the seventeenth possible implementation manner of the second aspect, or the eighteenth possible implementation manner of the second aspect, or the nineteenth possible implementation manner of the second aspect, in a twentieth possible implementation manner, the second frequency is an average value of the first frequency and the maximum frequency.

According to a third aspect of the present invention, an apparatus includes a number of units. A first unit is configured to obtain a usage and a working frequency of a working CPU. A second unit is configured to, when the usage is greater than a usage threshold, determine whether the working frequency is smaller than a first frequency. A third unit is configured to determine the working frequency as the first frequency when the working frequency is smaller than the first frequency, where the first frequency is smaller than a maximum frequency of the CPU.

In a first possible implementation manner of the third aspect, the apparatus further includes a fourth unit, which is configured to, when the working frequency is greater than or equal to the first frequency, determine whether the working frequency is smaller than or equal to a second frequency. The second frequency is greater than the first frequency and smaller than the maximum frequency. A fifth unit is configured to determine the working frequency as the second frequency when the working frequency is smaller than or equal to the second frequency.

In combination with the first possible implementation manner of the third aspect, in a second possible implementation manner, the fifth unit is specifically configured to determine the working frequency as the second frequency when the working frequency is smaller than or equal to the second frequency and a circulation keeping count value is smaller than a circulation keeping count threshold.

In combination with the second possible implementation manner of the third aspect, in a third possible implementation manner, the apparatus further includes: a sixth unit, configured to add 1 to the circulation keeping count value.

In combination with the first possible implementation manner of the third aspect, or the second possible implementation manner of the third aspect, or the third possible implementation manner of the third aspect, in a fourth possible implementation manner, the apparatus further includes a seventh unit, which is configured to determine the working frequency as a third frequency when the working frequency is greater than the second frequency. The third frequency is equal to the maximum frequency.

In combination with the second possible implementation manner of the third aspect, or the third possible implementation manner of the third aspect, or the fourth possible implementation manner of the third aspect, in a fifth possible implementation manner, the apparatus further includes an eighth unit, configured to determine the working frequency as the maximum frequency when the circulation keeping count value is greater than or equal to the circulation keeping count threshold.

In combination with the second possible implementation manner of the third aspect, or the third possible implementation manner of the third aspect, or the fourth possible implementation manner of the third aspect, or the fifth possible implementation manner of the third aspect, in a sixth possible implementation manner, the apparatus further includes a ninth unit, configured to clear the circulation keeping count value when the usage is greater than the usage threshold and the working frequency is smaller than or equal to the first frequency.

In combination with the third aspect, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, or the sixth possible implementation manner of the third aspect, in a seventh possible implementation manner, the apparatus further includes a tenth unit, configured to, when the usage is smaller than or equal to the usage threshold, obtain a product of the usage and the working frequency, determine the working frequency as a frequency value closest to the product, and clear the circulation keeping count value.

In an eighth possible implementation manner of the third aspect, the apparatus further includes an eleventh unit, configured to determine the working frequency as the maximum frequency when the working frequency is greater than or equal to the first frequency.

In combination with the third aspect, or the eighth possible implementation manner of the third aspect, in a ninth possible implementation manner, the third unit is specifically configured to determine the working frequency as the first frequency when the working frequency is smaller than the first frequency and a circulation keeping count value is smaller than a circulation keeping count threshold.

In combination with the ninth possible implementation manner of the third aspect, in a tenth possible implementation manner, the apparatus further includes: a twelfth unit, configured to add 1 to the circulation keeping count value.

In combination with the ninth possible implementation manner of the third aspect, or the tenth possible implementation manner of the third aspect, in an eleventh possible implementation manner, the apparatus further includes a thirteenth unit, configured to determine the working frequency as the maximum frequency when the circulation keeping count value is greater than or equal to the circulation keeping count threshold.

In combination with the ninth possible implementation manner of the third aspect, or the tenth possible implementation manner of the third aspect, or the eleventh possible implementation manner of the third aspect, in a twelfth possible implementation manner, the apparatus further includes a fourteenth unit, configured to, when the usage is smaller than or equal to the usage threshold, obtain a product of the usage and the working frequency, determine the working frequency as a frequency value closest to the product, and clear the circulation keeping count value.

In combination with the third aspect, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, or the sixth possible implementation manner of the third aspect, or the seventh possible implementation manner of the third aspect, or the eighth possible implementation manner of the third aspect, or the ninth possible implementation manner of the third aspect, or the tenth possible implementation manner of the third aspect, or the eleventh possible implementation manner of the third aspect, or the twelfth possible implementation manner of the third aspect, in a thirteenth possible implementation manner, the apparatus further includes a timer, configured to execute steps of the method when timing of the timer corresponding to the CPU expires.

In combination with the thirteenth possible implementation manner of the third aspect, in a fourteenth possible implementation manner, the method further includes a fifteenth unit, configured to control the timer to stop timing when a system is idle.

In combination with the thirteenth possible implementation manner of the third aspect, or the fourteenth possible implementation manner of the third aspect, in a fifteenth possible implementation manner, the method further includes a sixteenth unit, configured to control the timer to start timing when the system exits idle.

In combination with the thirteenth possible implementation manner of the third aspect, or the fourteenth possible implementation manner of the third aspect, or the fifteenth possible implementation manner of the third aspect, in a sixteenth possible implementation manner, the method further includes a seventeenth unit, configured to control the timer to stop timing if working frequencies which correspond to the timer and are obtained when timing of the timer expires successively are all the maximum frequency, and the number of times that the working frequencies are all the maximum frequency is just greater than a threshold of the number of periods in which the maximum frequency lasts.

In combination with the sixteenth possible implementation manner of the third aspect, in a seventeenth possible implementation manner, the threshold of the number of the periods in which the maximum frequency lasts is:

(start CPU power consumption sensitive factor threshold×open core sampling space)/(usage threshold×frequency weight), where the frequency weight is a first weight.

The number of times that the working frequencies are all the maximum frequency is just greater than a threshold of the number of periods in which the maximum frequency lasts is the number of times that the working frequencies are all the maximum frequency is the threshold of the number of the periods in which the maximum frequency lasts plus 1.

In combination with the third aspect, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, or the sixth possible implementation manner of the third aspect, or the seventh possible implementation manner of the third aspect, or the eighth possible implementation manner of the third aspect, or the ninth possible implementation manner of the third aspect, or the tenth possible implementation manner of the third aspect, or the eleventh possible implementation manner of the third aspect, or the twelfth possible implementation manner of the third aspect, or the thirteenth possible implementation manner of the third aspect, or the fourteenth possible implementation manner of the third aspect, or the fifteenth possible implementation manner of the third aspect, or the sixteenth possible implementation manner of the third aspect, or the seventeenth possible implementation manner of the third aspect, in an eighteenth possible implementation manner, the first frequency is a frequency corresponding to an inflection point of a current-frequency curve.

In combination with the eighteenth possible implementation manner of the third aspect, in a nineteenth possible implementation manner, in the current-frequency curve, a first slope is smaller than a second slope and the first slope is a slope of a straight line formed by measurement points whose frequencies are lower than the frequency corresponding to the inflection point. The second slope is a slope of a straight line formed by measurement points whose frequencies are higher than the frequency corresponding to the inflection point.

In combination with the first possible implementation manner of the third aspect, or the second possible implementation manner of the third aspect, or the third possible implementation manner of the third aspect, or the fourth possible implementation manner of the third aspect, or the fifth possible implementation manner of the third aspect, or the sixth possible implementation manner of the third aspect, or the seventh possible implementation manner of the third aspect, or the eighth possible implementation manner of the third aspect, or the ninth possible implementation manner of the third aspect, or the tenth possible implementation manner of the third aspect, or the eleventh possible implementation manner of the third aspect, or the twelfth possible implementation manner of the third aspect, or the thirteenth possible implementation manner of the third aspect, or the fourteenth possible implementation manner of the third aspect, or the fifteenth possible implementation manner of the third aspect, or the sixteenth possible implementation manner of the third aspect, or the seventeenth possible implementation manner of the third aspect, or the eighteenth possible implementation manner of the third aspect, or the nineteenth possible implementation manner of the third aspect, in a twentieth possible implementation manner, the second frequency is an average value of the first frequency and the maximum frequency.

According to a fourth aspect of the present invention, a computer program carrying a program code is provided, where when the computer program runs on a computer, the program code executes the method described in combination with the first aspect of the present invention; or the first possible implementation manner of the first aspect; or the second possible implementation manner of the first aspect; or the third possible implementation manner of the first aspect; or the fourth possible implementation manner of the first aspect; or the fifth possible implementation manner of the first aspect; or the sixth possible implementation manner of the first aspect; or the seventh possible implementation manner of the first aspect; or the eighth possible implementation manner of the first aspect; or the ninth possible implementation manner of the first aspect; or the tenth possible implementation manner of the first aspect; or the eleventh possible implementation manner of the first aspect; or the twelfth possible implementation manner of the first aspect; or the thirteenth possible implementation manner of the first aspect; or the fourteenth possible implementation manner of the first aspect; or the fifteenth possible implementation manner of the first aspect; or the sixteenth possible implementation manner of the first aspect; or the seventeenth possible implementation manner of the first aspect; or the eighteenth possible implementation manner of the first aspect; or the nineteenth possible implementation manner of the first aspect; or the twentieth possible implementation manner of the first aspect; or the second aspect of the present invention; or the first possible implementation manner of the second aspect; or the second possible implementation manner of the second aspect; or the third possible implementation manner of the second aspect; or the fourth possible implementation manner of the second aspect; or the fifth possible implementation manner of the second aspect; or the sixth possible implementation manner of the second aspect; or the seventh possible implementation manner of the second aspect; or the eighth possible implementation manner of the second aspect; or the ninth possible implementation manner of the second aspect; or the tenth possible implementation manner of the second aspect; or the eleventh possible implementation manner of the second aspect; or the twelfth possible implementation manner of the second aspect; or the thirteenth possible implementation manner of the second aspect; or the fourteenth possible implementation manner of the second aspect; or the fifteenth possible implementation manner of the second aspect; or the sixteenth possible implementation manner of the second aspect; or the seventeenth possible implementation manner of the second aspect; or the eighteenth possible implementation manner of the second aspect; or the nineteenth possible implementation manner of the second aspect; or the twentieth possible implementation manner of the second aspect; or the third aspect of the present invention; or the first possible implementation manner of the third aspect; or the second possible implementation manner of the third aspect; or the third possible implementation manner of the third aspect; or the fourth possible implementation manner of the third aspect; or the fifth possible implementation manner of the third aspect; or the sixth possible implementation manner of the third aspect; or the seventh possible implementation manner of the third aspect; or the eighth possible implementation manner of the third aspect; or the ninth possible implementation manner of the third aspect; or the tenth possible implementation manner of the third aspect; or the eleventh possible implementation manner of the third aspect; or the twelfth possible implementation manner of the third aspect; or the thirteenth possible implementation manner of the third aspect; or the fourteenth possible implementation manner of the third aspect; or the fifteenth possible implementation manner of the third aspect; or the sixteenth possible implementation manner of the third aspect; or the seventeenth possible implementation manner of the third aspect; or the eighteenth possible implementation manner of the third aspect; or the nineteenth possible implementation manner of the third aspect; or the twentieth possible implementation manner of the third aspect.

According to a fifth aspect of the present invention, a computer readable storage medium is provided, where the computer stores a computer program code, and when the computer program code is executed by a computer, the computer program code may enable the computer to execute the method described in combination with the first aspect of the present invention; or the first possible implementation manner of the first aspect; or the second possible implementation manner of the first aspect; or the third possible implementation manner of the first aspect; or the fourth possible implementation manner of the first aspect; or the fifth possible implementation manner of the first aspect; or the sixth possible implementation manner of the first aspect; or the seventh possible implementation manner of the first aspect; or the eighth possible implementation manner of the first aspect; or the ninth possible implementation manner of the first aspect; or the tenth possible implementation manner of the first aspect; or the eleventh possible implementation manner of the first aspect; or the twelfth possible implementation manner of the first aspect; or the thirteenth possible implementation manner of the first aspect; or the fourteenth possible implementation manner of the first aspect; or the fifteenth possible implementation manner of the first aspect; or the sixteenth possible implementation manner of the first aspect; or the seventeenth possible implementation manner of the first aspect; or the eighteenth possible implementation manner of the first aspect; or the nineteenth possible implementation manner of the first aspect; or the twentieth possible implementation manner of the first aspect; or the second aspect of the present invention; or the first possible implementation manner of the second aspect; or the second possible implementation manner of the second aspect; or the third possible implementation manner of the second aspect; or the fourth possible implementation manner of the second aspect; or the fifth possible implementation manner of the second aspect; or the sixth possible implementation manner of the second aspect; or the seventh possible implementation manner of the second aspect; or the eighth possible implementation manner of the second aspect; or the ninth possible implementation manner of the second aspect; or the tenth possible implementation manner of the second aspect; or the eleventh possible implementation manner of the second aspect; or the twelfth possible implementation manner of the second aspect; or the thirteenth possible implementation manner of the second aspect; or the fourteenth possible implementation manner of the second aspect; or the fifteenth possible implementation manner of the second aspect; or the sixteenth possible implementation manner of the second aspect; or the seventeenth possible implementation manner of the second aspect; or the eighteenth possible implementation manner of the second aspect; or the nineteenth possible implementation manner of the second aspect; or the twentieth possible implementation manner of the second aspect; or the third aspect of the present invention; or the first possible implementation manner of the third aspect; or the second possible implementation manner of the third aspect; or the third possible implementation manner of the third aspect; or the fourth possible implementation manner of the third aspect; or the fifth possible implementation manner of the third aspect; or the sixth possible implementation manner of the third aspect; or the seventh possible implementation manner of the third aspect; or the eighth possible implementation manner of the third aspect; or the ninth possible implementation manner of the third aspect; or the tenth possible implementation manner of the third aspect; or the eleventh possible implementation manner of the third aspect; or the twelfth possible implementation manner of the third aspect; or the thirteenth possible implementation manner of the third aspect; or the fourteenth possible implementation manner of the third aspect; or the fifteenth possible implementation manner of the third aspect; or the sixteenth possible implementation manner of the third aspect; or the seventeenth possible implementation manner of the third aspect; or the eighteenth possible implementation manner of the third aspect; or the nineteenth possible implementation manner of the third aspect; or the twentieth possible implementation manner of the third aspect.

According to a sixth aspect of the present invention, a computer program product is provided, where the computer program product includes a computer program code, and when the computer program code is executed by a computer, the computer program code may enable the computer to execute the method described in combination with the first aspect of the present invention; or the first possible implementation manner of the first aspect; or the second possible implementation manner of the first aspect; or the third possible implementation manner of the first aspect; or the fourth possible implementation manner of the first aspect; or the fifth possible implementation manner of the first aspect; or the sixth possible implementation manner of the first aspect; or the seventh possible implementation manner of the first aspect; or the eighth possible implementation manner of the first aspect; or the ninth possible implementation manner of the first aspect; or the tenth possible implementation manner of the first aspect; or the eleventh possible implementation manner of the first aspect; or the twelfth possible implementation manner of the first aspect; or the thirteenth possible implementation manner of the first aspect; or the fourteenth possible implementation manner of the first aspect; or the fifteenth possible implementation manner of the first aspect; or the sixteenth possible implementation manner of the first aspect; or the seventeenth possible implementation manner of the first aspect; or the eighteenth possible implementation manner of the first aspect; or the nineteenth possible implementation manner of the first aspect; or the twentieth possible implementation manner of the first aspect; or the second aspect of the present invention; or the first possible implementation manner of the second aspect; or the second possible implementation manner of the second aspect; or the third possible implementation manner of the second aspect; or the fourth possible implementation manner of the second aspect; or the fifth possible implementation manner of the second aspect; or the sixth possible implementation manner of the second aspect; or the seventh possible implementation manner of the second aspect; or the eighth possible implementation manner of the second aspect; or the ninth possible implementation manner of the second aspect; or the tenth possible implementation manner of the second aspect; or the eleventh possible implementation manner of the second aspect; or the twelfth possible implementation manner of the second aspect; or the thirteenth possible implementation manner of the second aspect; or the fourteenth possible implementation manner of the second aspect; or the fifteenth possible implementation manner of the second aspect; or the sixteenth possible implementation manner of the second aspect; or the seventeenth possible implementation manner of the second aspect; or the eighteenth possible implementation manner of the second aspect; or the nineteenth possible implementation manner of the second aspect; or the twentieth possible implementation manner of the second aspect; or the third aspect of the present invention; or the first possible implementation manner of the third aspect; or the second possible implementation manner of the third aspect; or the third possible implementation manner of the third aspect; or the fourth possible implementation manner of the third aspect; or the fifth possible implementation manner of the third aspect; or the sixth possible implementation manner of the third aspect; or the seventh possible implementation manner of the third aspect; or the eighth possible implementation manner of the third aspect; or the ninth possible implementation manner of the third aspect; or the tenth possible implementation manner of the third aspect; or the eleventh possible implementation manner of the third aspect; or the twelfth possible implementation manner of the third aspect; or the thirteenth possible implementation manner of the third aspect; or the fourteenth possible implementation manner of the third aspect; or the fifteenth possible implementation manner of the third aspect; or the sixteenth possible implementation manner of the third aspect; or the seventeenth possible implementation manner of the third aspect; or the eighteenth possible implementation manner of the third aspect; or the nineteenth possible implementation manner of the third aspect; or the twentieth possible implementation manner of the third aspect.

It can be seen from the foregoing solutions that, in the method and the apparatus for controlling a central processing unit provided by the embodiments of the present invention, after the CPU usage is greater than the usage threshold, it is further determined whether the working frequency is smaller than the first frequency. When the working frequency is smaller than the first frequency, the working frequency is determined as the first frequency smaller than the maximum frequency of the CPU. In this frequency adjustment manner, a CPU frequency is not adjusted to the maximum frequency once, thereby reducing the CPU power consumption when the CPU usage is greater than the usage threshold during frequency adjustment.

BRIEF DESCRIPTION OF THE DRAWINGS

To describe the technical solutions in the embodiments of the present invention or in the prior art more clearly, accompanying drawings for describing the embodiments or the prior art are introduced briefly in the following.

DETAILED DESCRIPTION OF ILLUSTRATIVE EMBODIMENTS

In order to make the objectives, technical solutions, and advantages of the present invention clearer, the embodiments of the present invention are described in further detail in the following with reference to the accompanying drawings.

Figure 1:
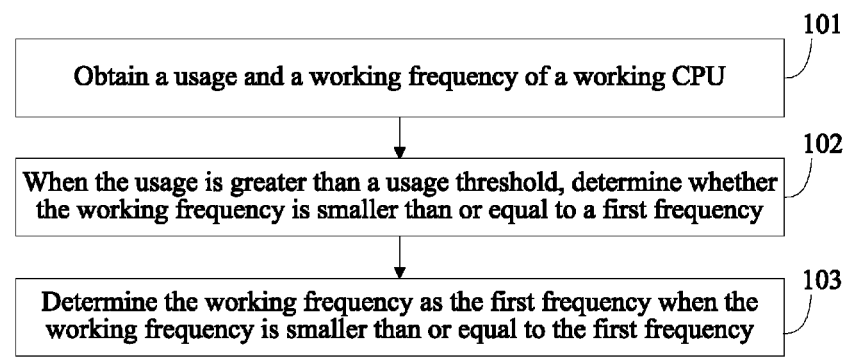
FIG. 1 is a brief flow chart of a method for controlling a CPU according to a first embodiment of the present invention.

A first embodiment of the present invention provides a method for controlling a CPU, and as shown in a brief flow chart of FIG. 1, the method includes the following steps.

Step 101: Obtain a usage and a working frequency of a working CPU.

Step 102: When the usage is greater than a usage threshold, determine whether the working frequency is smaller than a first frequency. The usage threshold may have different values according to different platforms, and a range of the value may be between 90% and 95%. The different platforms herein refer to different hardware chipsets.

Step 103: Determine the working frequency as the first frequency when the working frequency is smaller than the first frequency. The "determine . . . as the first frequency" herein refers to that if the working frequency is not the first frequency, change the working frequency to the first frequency. If the working frequency is the first frequency, keep the working frequency to be the first frequency.

The first frequency is smaller than a maximum frequency of the CPU.

In the method for controlling a central processing unit provided by the embodiment of the present invention, after the CPU usage is greater than the usage threshold, it is further determined whether the working frequency is smaller than the first frequency. When the working frequency is smaller than the first frequency, the working frequency is determined as the first frequency smaller than the maximum frequency of the CPU. In this frequency adjustment manner, a CPU frequency is not adjusted to the maximum frequency once, thereby reducing CPU power consumption during frequency adjustment.

Figure 2:
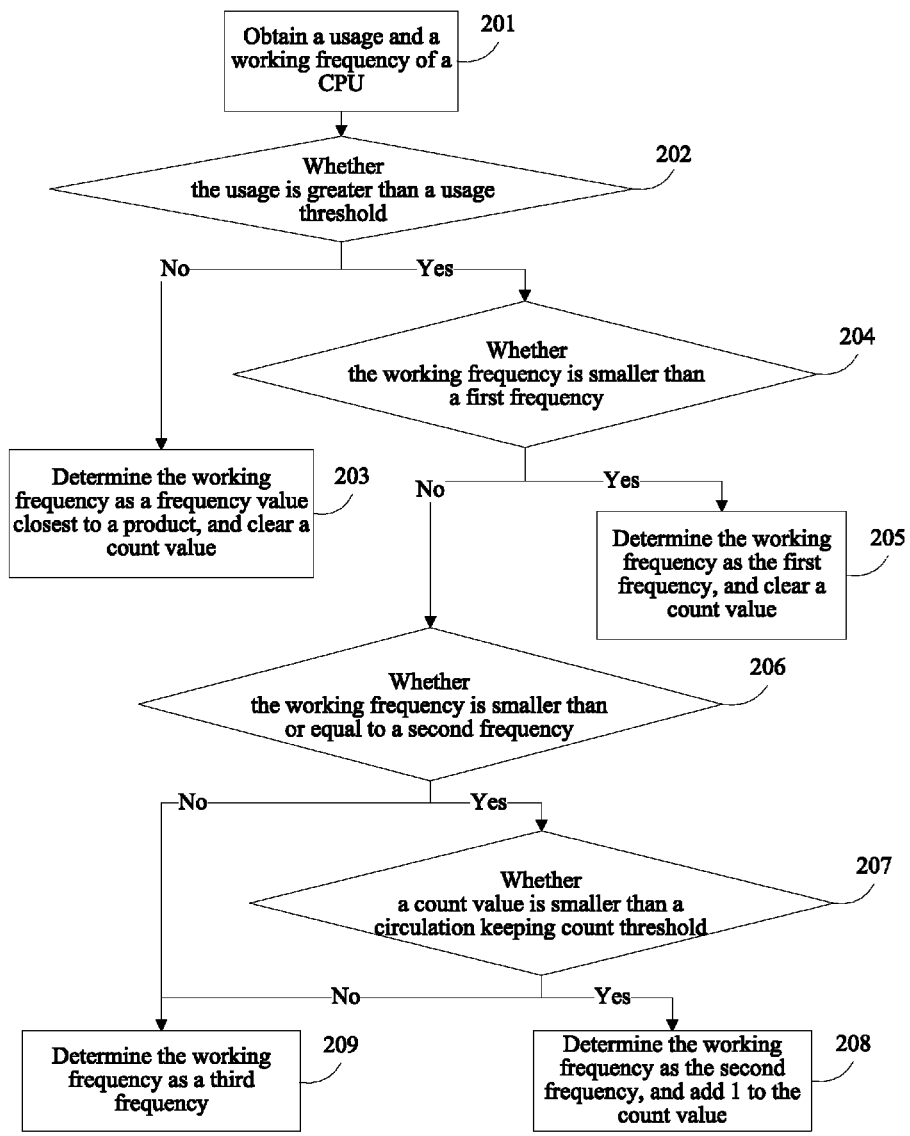
FIG. 2 is a detailed flow chart of a method for controlling a CPU according to a second embodiment of the present invention.

A second embodiment of the present invention provides a method for controlling a CPU, where the method is executed by a CPU responsible for scheduling. That is, the CPU executing the method may schedule another common CPU executing an instruction and computation. The CPU responsible for scheduling may be an independent CPU other than the another common CPU executing an instruction and computation, and a scheduling function may also be integrated in a certain common CPU executing an instruction and computation. A hardware form of the CPU responsible for scheduling (hereinafter referred to as "scheduling CPU" for short) may be an advanced reduced instruction set computing machines (Advanced Reduced Instruction Set Computing (RISC) Machines, ARM) chip, and may also be another chip such as a single-chip microcomputer. As shown in a detailed flow chart of FIG. 2, the method includes the following steps:

Step 201: Obtain a usage and a working frequency of a current working CPU. A usage value and a working frequency value of the CPU may be obtained through detection separately.

Step 202: Determine whether the usage of the CPU is greater than a usage threshold. If yes, perform step 204. Otherwise, perform step 203.

Step 203: When the usage of the CPU is smaller than or equal to the usage threshold, obtain a product of the usage and the working frequency, determine the working frequency as a frequency value closest to the product, and clear a circulation keeping count value.

The working frequency is an individual discrete value, and the product may not coincide with an individual discrete value, so it may be required to set the working frequency to a frequency value closest to the product. Certainly, if the product coincides with an individual discrete value, the working frequency may be set to a frequency value corresponding to the product. The "determining" herein refers to that, if the product does not coincide with the individual discrete value, the working frequency is set to the frequency value closest to the product. If the product coincides with the individual discrete value, the working frequency is set to the frequency value corresponding to the product. The meaning of other "determining" in the specification may be deduced by analogy with reference to the explanation herein, and is not repeatedly explained additionally.

In addition, the circulation keeping count value functions to be compared with a circulation keeping count threshold, if the circulation keeping count value is smaller than the circulation keeping count threshold, continue counting on the basis of an original count. Once the circulation keeping count value is greater than or equal to the circulation keeping count threshold, adjust a current frequency to a frequency higher than the current frequency.

Step 204: When the usage of the CPU is greater than the usage threshold, continue to determine whether the working frequency of the CPU is smaller than a first frequency. If the working frequency is smaller than the first frequency, perform step 205. Otherwise, perform step 206.

Step 205: Determine the working frequency as the first frequency when the working frequency is smaller than the first frequency. Further, the circulation keeping count value may also be cleared.

Step 206: When the working frequency is greater than or equal to the first frequency, continue to determine whether the working frequency of the CPU is smaller than or equal to a second frequency. The second frequency is greater than or equal to the first frequency, and is smaller than a maximum frequency. If the working frequency is smaller than or equal to the second frequency, perform step 207. Otherwise, perform step 209.

Step 207: When the working frequency is smaller than or equal to the second frequency, continue to determine whether the circulation keeping count value is smaller than the circulation keeping count threshold. If the circulation keeping count value is smaller than the circulation keeping count threshold, perform step 208. Otherwise, perform step 209.

Step 208: Determine the working frequency as the second frequency when the circulation keeping count value is smaller than the circulation keeping count threshold. Further, add 1 to the circulation keeping count value.

Step 209: Determine the working frequency as a third frequency when the circulation keeping count value is greater than or equal to the circulation keeping count threshold or the working frequency of the CPU is greater than the second frequency, where the third frequency is greater than the second frequency. The third frequency may be the maximum frequency of the CPU, or a frequency greater than the second frequency and smaller than the maximum frequency.

In the method for controlling a central processing unit provided in the embodiment of the present invention, by setting the second frequency higher than the first frequency and the third frequency higher than the second frequency, finer division of frequency levels is implemented, which is applicable to a CPU hardware chipset having a relatively high working frequency (for example, a maximum frequency may reach 1.5 GHz). Therefore, when the CPU has a relatively high frequency, user experience and CPU performance are ensured. Meanwhile, the frequency is not adjusted to the maximum frequency once, but the frequency is adjusted stepwise, thereby further saving power consumption of the CPU.

Figure 3:
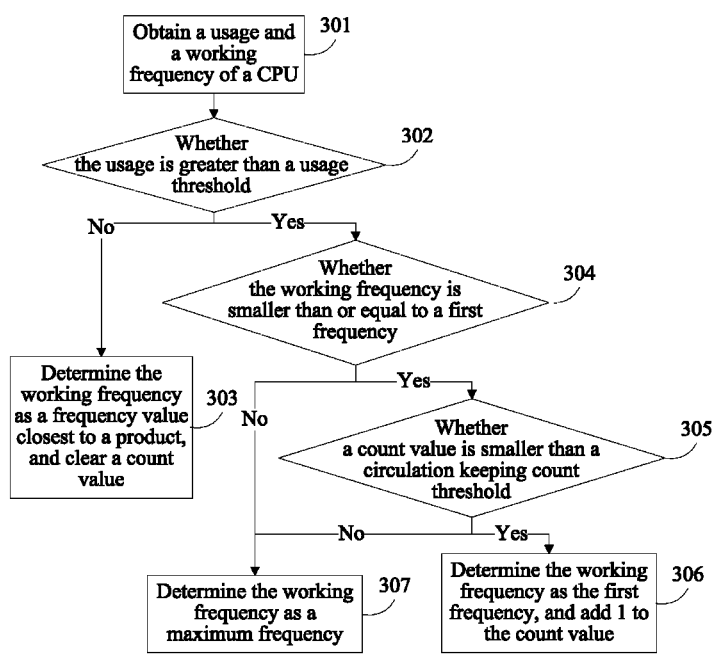
FIG. 3 is another detailed flow chart of a method for controlling a CPU according to a third embodiment of the present invention.

A third embodiment of the present invention provides a method for controlling a CPU, where the method is executed by a CPU responsible for scheduling. As shown in a detailed flow chart of FIG. 3, the method includes the following steps.

Step 301: Obtain a usage and a working frequency of a current working CPU. A usage value and a working frequency value of the CPU may be obtained through detection separately.

Step 302: Determine whether the usage of the CPU is greater than a usage threshold. If the usage of the CPU is greater than the usage threshold, perform step 304. Otherwise, perform step 303.

Step 303: When the usage of the CPU is smaller than or equal to the usage threshold, obtain a product of the usage and the working frequency, determine the working frequency as a frequency value closest to the product, and clear a circulation keeping count value.

The working frequency is an individual discrete value, and the product may not coincide with an individual discrete value, so it may be required to set the working frequency to a frequency value closest to the product. Certainly, if the product coincides with an individual discrete value, the working frequency may be set to a frequency value corresponding to the product.

In addition, the circulation keeping count value functions to be compared with a circulation keeping count threshold, if the circulation keeping count value is smaller than the circulation keeping count threshold, continue counting on the basis of an original count. Once the circulation keeping count value is greater than or equal to the circulation keeping count threshold, adjust a current frequency to a frequency higher than the current frequency.

Step 304: Determine whether the working frequency is smaller than a first frequency. If the working frequency is smaller than the first frequency, perform step 305. Otherwise, perform step 307. The first frequency is smaller than a maximum frequency.

Step 305: When the working frequency is smaller than the first frequency, determine whether the circulation keeping count value is smaller than the circulation keeping count threshold. If the circulation keeping count value is smaller than the circulation keeping count threshold, perform step 306. Otherwise, perform step 307.

Step 306: Determine the working frequency as the first frequency when the circulation keeping count value is smaller than the circulation keeping count threshold, and further add 1 to the circulation keeping count value.

Step 307: Determine the working frequency of the CPU as the maximum frequency when the circulation keeping count value is greater than or equal to the circulation keeping count threshold or the working frequency is greater than or equal to the first frequency.

In the method for controlling a central processing unit provided in the embodiment of the present invention, by setting the first frequency lower than the maximum frequency, grading of the frequency is implemented, and the method of this embodiment may be applicable to a CPU hardware chipset having a medium working frequency (for example, a maximum frequency may reach 1 GHz). Therefore, when the CPU has a relatively high frequency, user experience and CPU performance are ensured. Meanwhile, the frequency is not adjusted to the maximum frequency once, but the frequency is adjusted stepwise (for example, the frequency is first adjusted to the first frequency), thereby further saving power consumption of the CPU.

In addition, the method for controlling a central processing unit provided in the embodiment of the present invention may be further applied in a CPU hardware chipset having finer grading of frequency levels. For example, in the CPU hardware chipset, the working frequency may reach 2 GHz. In this case, the first frequency, the second frequency, a third frequency, or even a fourth frequency that are smaller than the maximum frequency may be set. For example, the third frequency may be set at a medium frequency of the first frequency and the second frequency in the second embodiment, and the fourth frequency may be set at a medium frequency between the second frequency and the maximum frequency in the second embodiment. Certainly, it may also be that a frequency between the first frequency and the maximum frequency is equally divided into three parts, five parts, or even N parts. N is a positive integer greater than or equal to 2.

A timing function may be newly added on the basis of the first embodiment, the second embodiment or the third embodiment. That is, each time when timing of a timer expires, execute the method of the first embodiment, the second embodiment, or the third embodiment.

A manner of controlling a timer includes stopping, by the timer, timing when a system is idle.

Further, the method may further include: starting, by the timer, timing when the system exits idle.

An operating system of a device where the scheduling CPU executing the method of the embodiment is located notifies the CPU responsible for scheduling whether the system is idle.

On the basis of the foregoing, another manner for controlling a timer includes stopping timing of the timer if working frequencies which correspond to the timer and are obtained when timing of the timer expires successively are all the maximum frequency, and the number of times that the working frequencies are all the maximum frequency is just greater than a threshold of the number of periods in which the maximum frequency lasts.

Specifically, the threshold of the number of the periods in which the maximum frequency lasts may be defined as (start CPU power consumption sensitive factor threshold×open core sampling space)/(usage threshold×frequency weight), where the frequency weight is a first weight, and may have a value of 4. The start CPU power consumption sensitive factor threshold may be set to 200. The open core sampling space is an integer greater than or equal to 1, for example, may have a value of 10.

That the number of times that the working frequencies are all the maximum frequency is just greater than a threshold of the number of periods in which the maximum frequency lasts may be the number of times that the working frequencies are all the maximum frequency is the threshold of the number of the periods in which the maximum frequency lasts plus 1.

For example, if working frequencies which correspond to the timer and are obtained when timing expires for 5 times successively are all the maximum frequency, and the threshold of the number of the periods in which the maximum frequency lasts is 4, the timer stops timing.

Figure 4:
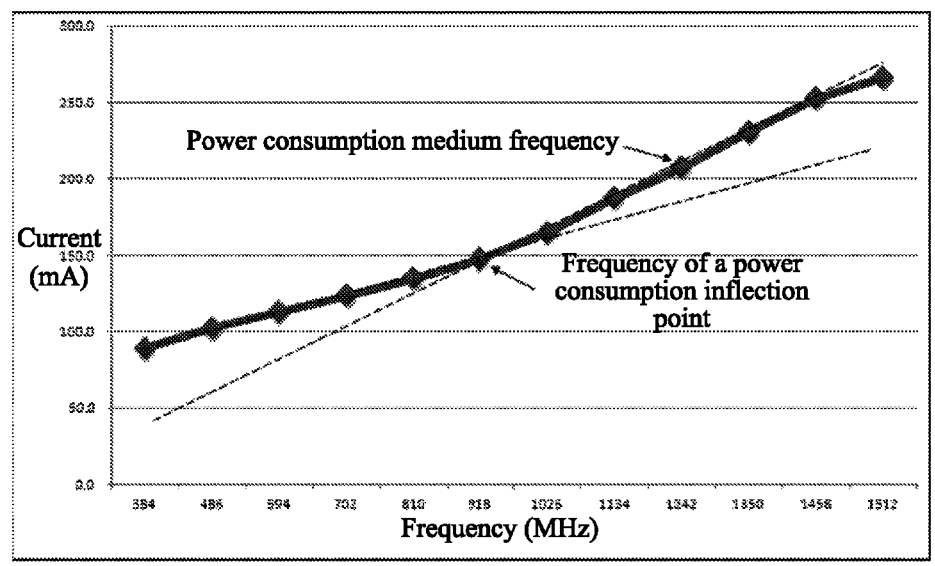
FIG. 4 is a schematic diagram of a current-frequency curve according to a fourth embodiment of the present invention.

A fourth embodiment of the present invention provides a method for controlling a CPU, and in the embodiment, on the basis of the first embodiment, the second embodiment or the third embodiment, how various frequencies lower than a maximum frequency are generated is described. As shown in FIG. 4, FIG. 4 is a schematic diagram of an actually measured current-frequency curve of a certain common CPU executing an instruction and computation. In FIG. 4, an abscissa represents a frequency, which has a unit of MHx (megahertz), and ascends sequentially from left to right. An ordinate represents current consumption of a common CPU, which ascends sequentially from bottom to top. The frequency of the abscissa is discrete, that is, the common CPU works at a discrete frequency point. Rhombic black points in the middle of FIG. 4 represent current consumption of actually measured measurement points working at specific frequency points.

According to the measurement points, a curve embodying a relationship between a current and a frequency may be drawn roughly, as shown by a black solid line in FIG. 4. The black solid line is not a straight line having a fixed slope, but is formed by connecting two straight lines each having a fixed slope. It can be seen that, in the black solid line, a slope (which may be referred to as a first slope) of a straight line formed by connecting measurement points whose frequencies are smaller than a frequency of a power consumption inflection point (that is, measurement points on the left of a measurement point corresponding to the frequency of the power consumption inflection point) is smaller than a slope (which may be referred to as a second slope) of a straight line formed by connecting measurement points whose frequencies are greater than the frequency of the power consumption inflection point (that is, measurement points on the right of the measurement point corresponding to the frequency of the power consumption inflection point). In the figure, the frequency of the power consumption inflection point corresponds to a specific value of 918 MHz, the value is roughly located at the middle of a maximum frequency 1512 MHz and a minimum frequency 384 MHz, and the frequency roughly located at the middle may ensure user experience and operating performance of the system. Certainly, the value may take another value in a different platform, for example, 702 MHz, 810 MHz, or 1026 MHz. In this case, a consumed current corresponding to the frequency of the power consumption inflection point is relatively low (corresponding to current consumption of 150 mA), so that the frequency of the power consumption inflection point may be set to an optimal working frequency point when the common CPU works. In the first embodiment, the second embodiment, or the third embodiment, the first frequency may be set to the frequency of the power consumption inflection point.

Considering that after a frequency of the common CPU is higher than the frequency of the power consumption inflection point, power consumption of the common CPU may be further saved, another frequency may be further set between the frequency of the power consumption inflection point and the maximum frequency, so that when the frequency of the common CPU is higher than the frequency of the power consumption inflection point, a working frequency of the common CPU is not adjusted to the maximum once. As shown in FIG. 4, a power consumption medium frequency may be set at a middle point between the frequency of the power consumption inflection point and the maximum frequency. When the working frequency of the common CPU is higher than the frequency of the power consumption inflection point, the working frequency of the common CPU may be adjusted to the power consumption medium frequency, instead of being adjusted to the maximum frequency once, thereby saving the power consumption of the common CPU. The power consumption medium frequency may be set to a second frequency.

When a maximum frequency of a certain common CPU may reach a higher frequency (for example, 2 GHz), a third frequency may be further set between the frequency of the power consumption inflection point and the power consumption medium frequency, and/or, a fourth frequency may be further set between the power consumption medium frequency and the maximum frequency. In this way, by finer grading of the frequency, different levels of frequency adjustment may be implemented, and therefore, in a process of adjusting the working frequency to a higher frequency, the working frequency is adjusted to a corresponding adaptive frequency sequentially according to a situation, instead of being adjusted to the maximum frequency or a frequency higher than the adaptive frequency once, thereby saving power consumption of the common CPU.

Figure 5:
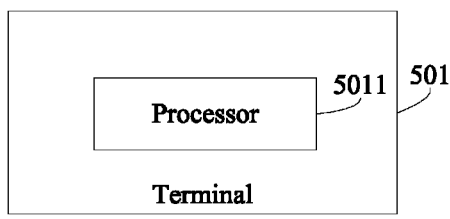
FIG. 5 is a schematic structural diagram of a terminal according to a fifth embodiment of the present invention.

A fifth embodiment of the present invention provides a terminal, as shown in FIG. 5. A terminal 501 includes a processor 5011. The processor 5011 may be a CPU responsible for scheduling, which functions to schedule and control one or more common CPUs.

The processor 5011 is configured to obtain a usage and a working frequency of a working CPU when the usage is greater than a usage threshold, to determine whether the working frequency is smaller than a first frequency, and to determine the working frequency as the first frequency when the working frequency is smaller than the first frequency.

The first frequency is smaller than a maximum frequency of the CPU.

A usage value and a working frequency value of the CPU may be obtained through detection separately.

The usage threshold may have different values according to different platforms, and a range of the value may be between 90% and 95%. The different platforms herein refer to different hardware chipsets.

In a first implementation manner, the processor may include the following functions:

Further, the processor may be further configured to, when the working frequency is greater than or equal to the first frequency, determine whether the working frequency is smaller than or equal to a second frequency, where the second frequency is greater than the first frequency and smaller than the maximum frequency, and to determine the working frequency as the second frequency when the working frequency is smaller than or equal to the second frequency.

That the processor determines the working frequency as the second frequency when the working frequency is smaller than or equal to the second frequency may specifically include determining the working frequency as the second frequency when the working frequency is smaller than or equal to the second frequency and a circulation keeping count value is smaller than a circulation keeping count threshold, where the circulation keeping count value functions to be compared with a circulation keeping count threshold, and if the circulation keeping count value is smaller than the circulation keeping count threshold, it is continued to count on the basis of an original count. Once the circulation keeping count value is greater than or equal to the circulation keeping count threshold, a current frequency is adjusted to a frequency higher than the current frequency. The processor may be further configured to add 1 to the circulation keeping count value.

Further, the processor may be further configured to determine the working frequency as a third frequency when the working frequency is greater than the second frequency, where the third frequency is equal to the maximum frequency.

Further, the processor may be further configured to determine the working frequency as the maximum frequency when the circulation keeping count value is greater than or equal to the circulation keeping count threshold.

Further, the processor may be further configured to clear the circulation keeping count value when the usage is greater than the usage threshold and the working frequency is smaller than or equal to the first frequency.

Further, the processor may be further configured to, when the usage is smaller than or equal to the usage threshold, obtain a product of the usage and the working frequency, determine the working frequency as a frequency value closest to the product, and clear the circulation keeping count value.

In a second implementation manner, the processor may include the following functions:

The processor may be further configured to determine the working frequency as the maximum frequency when the working frequency is greater than or equal to the first frequency.

That the processor determines the working frequency as the first frequency when the working frequency is smaller than the first frequency may specifically be: determine the working frequency as the first frequency when the working frequency is smaller than the first frequency and the circulation keeping count value is smaller than the circulation keeping count threshold. Further, the processor may be further configured to: add 1 to the circulation keeping count value.

The processor may be further configured to determine the working frequency as the maximum frequency when the circulation keeping count value is greater than or equal to the circulation keeping count threshold.

The processor may be further configured to, when the usage is smaller than or equal to the usage threshold, obtain a product of the usage and the working frequency, determine the working frequency as a frequency value closest to the product, and clear the circulation keeping count value.

Further, the following functions of the processor are applicable to the first implementation manner and the second implementation manner.

The processor is further configured to execute functions of the processor in each of the foregoing implementation manners when timing of a timer corresponding to the CPU expires.

Further, the processor may be further configured to control the timer to stop timing when a system is idle.

Further, the processor may be further configured to control the timer to start timing when the system exits idle. An operating system of a device where the scheduling CPU executing the method of the embodiment is located notifies the CPU responsible for scheduling whether the system is idle.

Further, the processor is further configured to control the timer to stop timing if working frequencies which correspond to the timer and are obtained when timing of the timer expires successively are all the maximum frequency, and the number of times that the working frequencies are all the maximum frequency is just greater than a threshold of the number of periods in which the maximum frequency lasts.

Specifically, the threshold of the number of the periods in which the maximum frequency lasts may be defined as: (start CPU power consumption sensitive factor threshold×open core sampling space)/(usage threshold×frequency weight), where the frequency weight is a first weight, and may have a value of 4. The start CPU power consumption sensitive factor threshold may be set to 200. The open core sampling space is an integer greater than or equal to 1, for example, may have a value of 10.

That the number of times that the working frequencies are all the maximum frequency is just greater than a threshold of the number of periods in which the maximum frequency lasts is: the number of times that the working frequencies are all the maximum frequency is the threshold of the number of the periods in which the maximum frequency lasts plus 1.

For example, if working frequencies which correspond to the timer and are obtained when timing expires for 5 times successively are all the maximum frequency, and the threshold of the number of the periods in which the maximum frequency lasts is 4, the timer stops timing.

The first frequency may be a frequency corresponding to an inflection point in a current-frequency curve.

In the current-frequency curve shown in FIG. 4, a first slope is smaller than a second slope.

The first slope is a slope of a straight line formed by measurement points whose frequencies are lower than the frequency corresponding to the inflection point. The second slope is a slope of a straight line formed by measurement points whose frequencies are higher than the frequency corresponding to the inflection point.

The second frequency is an average value of the first frequency and the maximum frequency.

For determining of various medium frequencies lower than the maximum frequency, reference may be further made to FIG. 4 and description of the fourth embodiment of the present invention, and details are not repeatedly described herein.

The terminal provided by the fifth embodiment of the present invention implements grading of the frequency by setting the first frequency lower than the maximum frequency, or further including the second frequency, and so on. The terminal of the embodiment may be applicable to a CPU hardware chipset having a medium working frequency (for example, a maximum frequency may reach 1 GHz), or a CPU hardware chipset having a relatively high working frequency (for example, a maximum frequency may reach 1.5 GHz (gigahertz)). Therefore, when the CPU has a relatively high frequency, user experience and CPU performance are ensured. Meanwhile, the frequency is not adjusted to the maximum frequency once, but the frequency is adjusted stepwise (for example, the frequency is first adjusted to the first frequency or second frequency), thereby further saving power consumption of the CPU.

Figure 6:
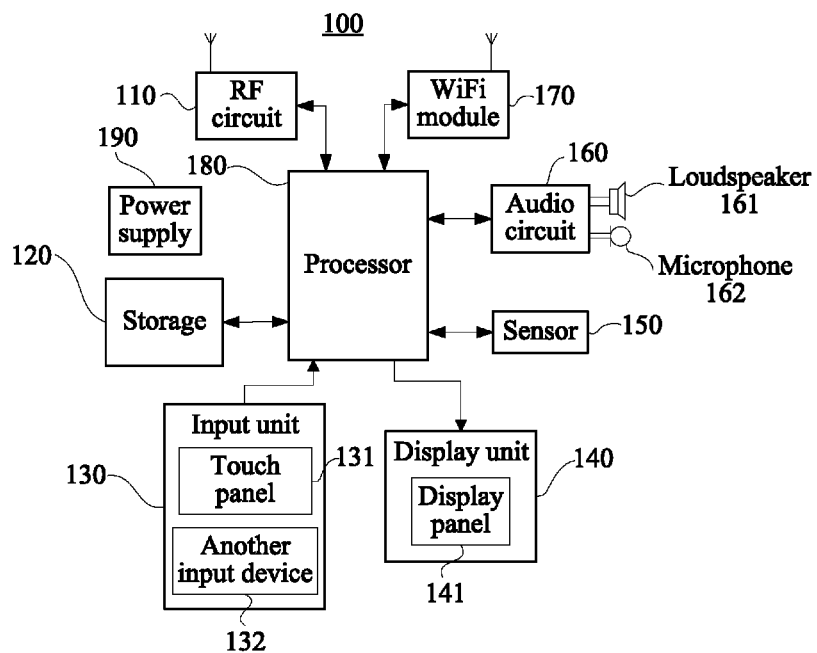
FIG. 6 is a block diagram of a partial structure of a mobile phone according to a sixth embodiment of the present invention.

A sixth embodiment of the present invention further provides a mobile phone, and the mobile phone is a specific form of the terminal provided in the fifth embodiment of the present invention. Further, the terminal may further include a tablet computer, a PDA (Personal Digital Assistant, personal digital assistant), a POS (Point of Sales, point of sales), a vehicle-mounted computer, and the like. A type of the terminal is not limited in the specification, and a terminal may be considered as the terminal involved in the specification as long as the terminal does not belong to a central office end device. FIG. 6 is a block diagram of a partial structure of a mobile phone. Referring to FIG. 6, a mobile phone 100 includes components such as an RF (Radio Frequency, radio frequency) circuit 110, a storage 120, an input unit 130, a display unit 140, a sensor 150, an audio circuit 160, a WiFi (wireless fidelity) module 170, a processor 180, and a power supply 190. Persons skilled in the art should understand that the mobile phone structure shown in FIG. 6 does not form a limitation to the mobile phone, and the mobile phone may include more or less components than those shown in the figure, or combine some components, or have different component deployment.

The composition components of the mobile phone 100 are introduced in detail in the following in combination with FIG. 6.

The RF circuit 110 may be configured to receive and send a signal during information receiving/sending or a calling process, particularly, receive downlink information of a base station and send the downlink information to the processor 180 for processing. In addition, the base station data designed to be uplink can be sent. Generally, the RF circuit includes, but is not limited to, an antenna, at least one amplifier, a transceiver, a coupler, an LNA (low noise amplifier), a duplexer, and the like. In addition, the RF circuit 110 may further communicate with another device through wireless communications. The wireless communications may use any communication standard or protocol, which includes, but is not limited to, a GSM (global system of mobile communication), GPRS (general packet radio service), CDMA (code division multiple access), WCDMA (wideband code division multiple access), LTE (long term evolution), an email, an SMS (short messaging service), and the like.

The storage 120 may be configured to store a software program and a module. The processor 180 executes various function applications and data processing of the mobile phone 100 by running the software program and the module stored in the storage 120. The storage 120 may mainly include a program storage area and a data storage area, where the program storage area may store an operating system, an application program required by at least one function (such as an audio playing function and an image playing function), and the like. The data storage area may store data (such as audio data and a phone book) created according to using of the mobile phone 100. Moreover, the storage 120 may include a high-speed random access memory, and may further include a non-volatile memory, for example, at least one disk memory device, a flash memory device, or another volatile solid-state memory device.

The input unit 130 may be configured to receive input numeral or character information, and generate a key signal input related to user setting and function control of the mobile phone 100. Specifically, the input unit 130 may include a touch panel 131 and another input device 132. The touch panel 131 is also referred to as a touchscreen, which may collect a touch operation of a user on the touch panel or near the touch panel (for example, an operation of the user on the touch panel 131 or near the touch panel 131 by using any suitable object or attachment such as a finger and a stylus), and drive a corresponding connection apparatus according to a preset program. Optionally, the touch panel 131 may include two parts, namely, a touch detection apparatus and a touch controller. The touch detection apparatus detects a touch direction of the user, detects a signal brought by a touch operation, and transmits the signal to the touch controller. The touch controller receives touch information from the touch detection apparatus, converts the touch information into contact coordinates, sends the contact coordinates to the processor 180, and receives a command sent by the processor 180 and executes the command.

Moreover, the touch panel 131 may be implemented by adopting various types such as a resistive type, a capacitive type, an infrared type, and a surface acoustic wave type. In addition to the touch panel 131, the input unit 130 may further include another input device 132. Specifically, the another input device 132 may include, but not limited to, one or more of a physical keyboard, a function key (such as a volume control button and a switch button), a trackball, a mouse, and an operating level.

The display unit 140 may be configured to display information input by the user or information provided for the user and various menus of the mobile phone 100. The display unit 140 may include a display panel 141, and optionally, the display panel 141 may be configured in a form such as an LCD (Liquid Crystal Display, liquid crystal display) and an OLED (Organic Light-Emitting Diode, organic light-emitting diode). Further, the touch panel 131 may cover the display panel 141, and when detecting a touch operation on or near the touch panel 131, the touch panel 131 transmits the touch operation to the processor 180 for determining a type of a touch event, and then the processor 180 provides a corresponding visual output on the display panel 141 according to the type of the touch event.

In FIG. 6, although the touch panel 131 and the display panel 141 implement input and input functions of the mobile phone 100 as two separated components, in some embodiments, the touch panel 131 and the display panel 141 may be integrated to implement the input and output functions of the mobile phone 100.

The mobile phone 100 may further include at least one sensor 150, such as an optical sensor, a motion sensor, and another sensor. Specifically, the optical sensor may include an ambient light sensor and a proximity sensor, where the ambient light sensor may adjust brightness of the display panel 141 according to illumination of ambient light, and the proximity sensor may close the display panel 141 and/or backlight when the mobile phone 100 is moved to an ear. As one kind of motion sensor, an accelerometer sensor may detect magnitude of acceleration in various directions (generally in three axes), may detect magnitude and a direction of the gravity when being static, and may be configured to identify an application of mobile phone gesture (for example, switching between portrait and landscape orientation, a related game, and magnetometer gesture calibration), identify a vibration related function (for example, a pedometer, knocking), and the like. Other sensors, such as a gyroscope, a barometer, a hygrometer, a thermometer, and an infrared sensor, may be further configured in the mobile phone 100, and are not described in detail herein.

The audio circuit 160, a loudspeaker 161, and a microphone 162 may provide an audio interface between the user and the mobile phone 100. The audio circuit 160 may transmit an electrical signal converted from received audio data to the loudspeaker 161, the loudspeaker 161 converts the electrical signal into a sound signal and then outputs the sound signal. On the other hand, the microphone 162 converts a collected sound signal into an electrical signal, the audio circuit 160 receives the electrical signal, converts the electrical signal into audio data, and then outputs the audio data to the RF circuit 108, so as to send the audio data to, for example, another mobile phone, or outputs the audio data to the storage 120 for further processing.

WiFi belongs to a short-distance wireless transmission technology, and the mobile phone 100 may help the user transmit and receive an email, browse a webpage, visit a stream media, and the like through the WiFi module 170, which provides wireless broadband Internet access for the user. FIG. 1 shows the WiFi module 170. However, it should be understood that, the WiFi module 170 is not a necessity of the mobile phone 100, and may be omitted according to a requirement without changing the essential scope of the present invention.

The processor 180 is a control center of the mobile phone 100, and connects to various parts of the mobile phone by using various interfaces and circuits, and executes various functions of the mobile phone 100 and processes data by running or executing a software program and/or module stored in the storage 120 and using data stored in the storage 120, thereby performing overall monitoring on the mobile phone. Preferably, the processor 180 may integrate an application processor and a modem processor, where the application processor mainly processes an operating system, a user interface, applications, and the like, and the modem processor mainly processes wireless communications. It should be understood that, the modem processor may not be integrated in the processor 180.

Optionally, the processor 180 may include one or more processing units. The one or more processing units may include one independent scheduling CPU and one or more common CPUs. The scheduling CPU may schedule the common CPU. A hardware form of the scheduling CPU may be an advanced reduced instruction set computing machine (Advanced Reduced Instruction Set Computing (RISC) Machines, ARM) chip, and may also be another chip such as a single-chip microcomputer. The common CPU refers to a common CPU executing an instruction and computation. It should be understood that, a function of the scheduling CPU may also be integrated in one or more common CPUs, which is not limited in this embodiment. For the function of the scheduling CPU, reference may be made to the first embodiment to the fifth embodiment, and details are not repeatedly described herein.

The mobile phone 100 further includes the power supply 190 (for example, a battery) supplying power to various components. Preferably, the power supply may logically connect to the processor 180 through a power supply management system, so as to implement functions such as charging, discharging, and power consumption management through the power supply management system.

Although not shown, the mobile phone 100 may further include a camera, a Bluetooth module, and the like, which are not described in detail herein.

Figure 7:
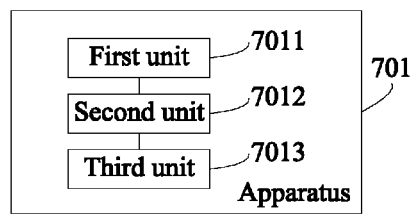
FIG. 7 is a brief schematic structural diagram of an apparatus according to a seventh embodiment of the present invention.

A seventh embodiment of the present invention further provides an apparatus. As shown in FIG. 7, the apparatus 701 includes a number of units. A first unit 7011 is configured to obtain a usage and a working frequency of a working CPU. A second unit 7012 is configured to, when the usage is greater than a usage threshold, determine whether the working frequency is smaller than a first frequency. A third unit 7013 is configured to determine the working frequency as the first frequency when the working frequency is smaller than the first frequency.

The first frequency is smaller than a maximum frequency of the CPU. The usage threshold may have different values according to different platforms, and a range of the value may be between 90% and 95%. The different platforms herein refer to different hardware chipsets.

After the usage of the CPU is greater than the usage threshold, the apparatus provided by the embodiment of the present invention further determines whether the working frequency is smaller than the first frequency. When the working frequency is smaller than the first frequency, the working frequency is determined as the first frequency smaller than the maximum frequency of the CPU. In this frequency adjustment manner, a CPU frequency is not adjusted to the maximum frequency once, thereby reducing CPU power consumption during frequency adjustment.

Figure 8A:
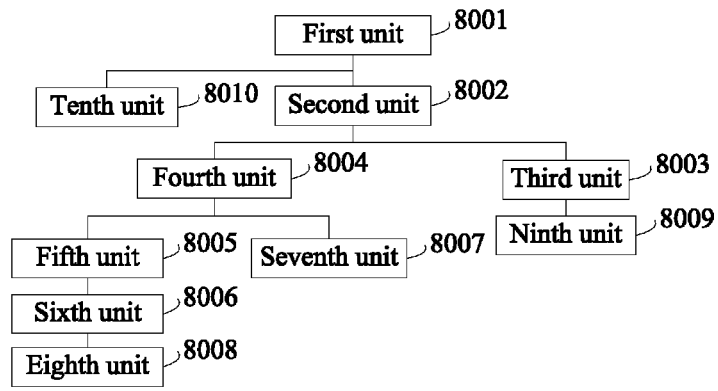
FIG. 8A is a first detailed schematic structural diagram of an apparatus according to an eighth embodiment of the present invention.

An eighth embodiment of the present invention further provides an apparatus, and as shown in FIG. 8A, on the basis of the seventh embodiment of the present invention, the apparatus further includes fourth and fifth units. The fourth unit is configured to, when the working frequency is greater than or equal to the first frequency, determine whether the working frequency is smaller than or equal to a second frequency, where the second frequency is greater than the first frequency and smaller than the maximum frequency. The fifth unit is configured to determine the working frequency as the second frequency when the working frequency is smaller than or equal to the second frequency, and the fifth unit may be further specifically configured to determine the working frequency as the second frequency when the working frequency is smaller than or equal to the second frequency and a circulation keeping count value is smaller than a circulation keeping count threshold.

Further, the apparatus may further include a sixth unit, configured to add 1 to the circulation keeping count value.

Further, the apparatus may further include a seventh unit, configured to determine the working frequency as a third frequency when the working frequency is greater than the second frequency, where the third frequency is equal to the maximum frequency.

Further, the apparatus may further include an eighth unit, configured to determine the working frequency as the maximum frequency when the circulation keeping count value is greater than or equal to the circulation keeping count threshold.

Further, the apparatus may further include a ninth unit, configured to clear the circulation keeping count value when the usage is greater than the usage threshold and the working frequency is smaller than or equal to the first frequency.

Further, the apparatus may further include a tenth unit, configured to, when the usage is smaller than or equal to the usage threshold, obtain a product of the usage and the working frequency, determine the working frequency as a frequency value closest to the product, and clear the circulation keeping count value.

In the apparatus provided in the embodiment of the present invention, by setting the second frequency higher than the first frequency and the third frequency higher than the second frequency, finer division of frequency levels is implemented, which is applicable to a CPU hardware chipset having a relatively high working frequency (for example, a maximum frequency may reach 1.5 GHz). Therefore, when the CPU has a relatively high frequency, user experience and CPU performance are ensured. Meanwhile, the frequency is not adjusted to the maximum frequency once, but the frequency is adjusted stepwise, thereby further saving power consumption of the CPU.

Figure 8B:
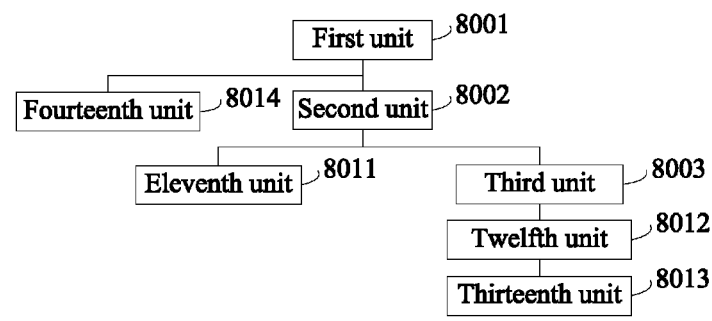
FIG. 8B is a second detailed schematic structural diagram of the apparatus according to the eighth embodiment of the present invention.

The eighth embodiment of the present invention further provides an apparatus, and as shown in FIG. 8B, on the basis of the seventh embodiment of the present invention, the apparatus further includes an eleventh unit, which is configured to determine the working frequency as the maximum frequency when the working frequency is greater than or equal to the first frequency.

Further, the third unit may be specifically configured to determine the working frequency as the first frequency when the working frequency is smaller than the first frequency and the circulation keeping count value is smaller than the circulation keeping count threshold.

Further, the apparatus may further include a twelfth unit, configured to add 1 to the circulation keeping count value.

Further, the apparatus may further include a thirteenth unit, configured to determine the working frequency as the maximum frequency when the circulation keeping count value is greater than or equal to the circulation keeping count threshold.

Further, the apparatus may further include a fourteenth unit, configured to, when the usage is smaller than or equal to the usage threshold, obtain a product of the usage and the working frequency, determine the working frequency as a frequency value closest to the product, and clear the circulation keeping count value.

In the method for controlling a central processing unit provided in the embodiment of the present invention, by setting the first frequency lower than the maximum frequency, grading of the frequency is implemented, and the method of this embodiment may be applicable to a CPU hardware chipset having a medium working frequency (for example, a maximum frequency may reach 1 GHz). Therefore, when the CPU has a relatively high frequency, user experience and CPU performance are ensured. Meanwhile, the frequency is not adjusted to the maximum frequency once, but the frequency is adjusted stepwise (for example, the frequency is first adjusted to the first frequency), thereby further saving power consumption of the CPU.

Figure 8C:
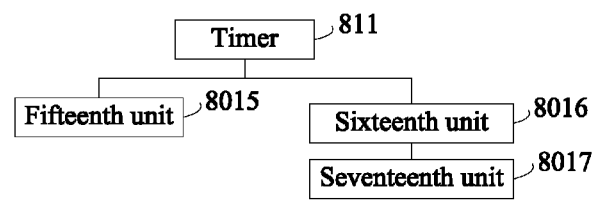
FIG. 8C is a schematic structural diagram of a timer in the apparatus according to the eighth embodiment of the present invention.

The eighth embodiment of the present invention further provides an apparatus, and as shown in FIG. 8C, on the basis of the seventh embodiment of the present invention or the embodiment corresponding to FIG. 8A or the embodiment corresponding to FIG. 8B, the apparatus further includes a timer, which is configured to, when timing of the timer corresponding to the CPU expires, execute functions of the apparatus described in the seventh embodiment of the present invention or the embodiment corresponding to FIG. 8A or the embodiment corresponding to FIG. 8B.

Further, the apparatus may further include a fifteenth unit, configured to control the timer to stop timing when a system is idle.

Further, the apparatus may further include a sixteenth unit, configured to control the timer to start timing when the system exits idle.

Further, the apparatus may further include a seventeenth unit, configured to control the timer to stop timing if working frequencies which correspond to the timer and are obtained when timing of the timer expires successively are all the maximum frequency, and the number of times that the working frequencies are all the maximum frequency is just greater than a threshold of the number of periods in which the maximum frequency lasts.

The threshold of the number of the periods in which the maximum frequency lasts is:

(start CPU power consumption sensitive factor threshold×open core sampling space)/(usage threshold×frequency weight), where the frequency weight is a first weight.

That the number of times that the working frequencies are all the maximum frequency is just greater than a threshold of the number of periods in which the maximum frequency lasts is: the number of times that the working frequencies are all the maximum frequency is the threshold of the number of the periods in which the maximum frequency lasts plus 1.

Determining of the first frequency and the second frequency in the seventh embodiment or the eighth embodiment may be performed with reference to the following manner:

The first frequency is a frequency corresponding to an inflection point in a current-frequency curve.

In the current-frequency curve of FIG. 4, a first slope is smaller than a second slope. The first slope is a slope of a straight line formed by measurement points whose frequencies are lower than the frequency corresponding to the inflection point. The second slope is a slope of a straight line formed by measurement points whose frequencies are higher than the frequency corresponding to the inflection point.

The second frequency is an average value of the first frequency and the maximum frequency.

Further, for determining of the first frequency and the second frequency, reference may also be made to FIG. 4 and relevant description in the fourth embodiment of the present invention, and details are not repeatedly described herein.

A ninth embodiment of the present invention further provides a computer program carrying a program code, where when the computer program runs on a computer, the program code executes the method described in the first embodiment to the fourth embodiment of the present invention.

A tenth embodiment of the present invention further provides a computer readable storage medium, where the computer stores a computer program code, and when the computer program code is executed by a computer, the computer program code may enable the computer to execute steps of the method described in the first embodiment to the fourth embodiment of the present invention.

An eleventh embodiment of the present invention further provides a computer program product, where the computer program product includes a computer program code, and when the computer program code is executed by a computer, the computer program code may enable the computer to execute steps of the method described in the first embodiment to the fourth embodiment of the present invention.

Apparently, persons skilled in the art may make various modifications and variations to the present invention without departing from the spirit and scope of the present invention. In this way, the present invention is intended to cover these modifications and variations if these modifications and variations to the present invention fall within the claims of the present invention and the scope of their equivalent technologies.

What is claimed is:

1. A terminal, comprising a processor coupled to a memory, wherein the processor is programmed to:
    obtain a usage and a working frequency of a working CPU;
    when the usage is greater than a usage threshold, determine whether the working frequency is smaller than a first frequency;
    determine the working frequency as the first frequency when the working frequency is smaller than the first frequency, wherein the first frequency is smaller than a maximum frequency of the CPU;

when the working frequency is greater than or equal to the first frequency, determine whether the working frequency is smaller than or equal to a second frequency, wherein the second frequency is greater than the first frequency and smaller than the maximum frequency; and determine the working frequency as the second frequency when the working frequency is smaller than or equal to the second frequency.

2. The terminal according to claim 1, wherein the processor is programmed to determine the working frequency as the second frequency when the working frequency is smaller than or equal to the second frequency by determining the working frequency as the second frequency when the working frequency is smaller than or equal to the second frequency and a circulation keeping count value is smaller than a circulation keeping count threshold.

3. The terminal according to claim 2, wherein the processor is further programmed to add 1 to the circulation keeping count value.

4. The terminal according to claim 2, wherein the processor is further programmed to determine the working frequency as the maximum frequency when the circulation keeping count value is greater than or equal to the circulation keeping count threshold.

5. The terminal according to claim 2, wherein the processor is further programmed to clear the circulation keeping count value when the usage is greater than the usage threshold and the working frequency is smaller than or equal to the first frequency.

6. The terminal according to claim 1, wherein the processor is further programmed to determine the working frequency as a third frequency when the working frequency is greater than the second frequency, wherein the third frequency is equal to the maximum frequency.

7. The terminal according to claim 1, wherein the second frequency is an average value of the first frequency and the maximum frequency.

8. The terminal according to claim 2, wherein the processor is further programmed to, when the usage is smaller than or equal to the usage threshold, obtain a product of the usage and the working frequency, determine the working frequency as a frequency value closest to the product, and to clear the circulation keeping count value.

9. The terminal according to claim 1, wherein the processor determines the working frequency as the first frequency when the working frequency is smaller than the first frequency by determining the working frequency as the first frequency when the working frequency is smaller than the first frequency and a circulation keeping count value is smaller than a circulation keeping count threshold.

10. The terminal according to claim 9, wherein the processor is further programmed to add 1 to the circulation keeping count value.

11. The terminal according to claim 9, wherein the processor is further programmed to determine the working frequency as the maximum frequency when the circulation keeping count value is greater than or equal to the circulation keeping count threshold.

12. The terminal according to claim 9, wherein the processor is further programmed to, when the usage is smaller than or equal to the usage threshold, obtain a product of the usage and the working frequency, determine the working frequency as a frequency value closest to the product, and clear the circulation keeping count value.

13. The terminal according to claim 1, wherein the processor is further programmed to execute one function when timing of a timer corresponding to the CPU expires.

14. The terminal according to claim 13, wherein the processor is further programmed to control the timer to stop timing when a system is idle.

15. The terminal according to claim 13, wherein the processor is further programmed to control the timer to start timing when a system exits idle.

16. The terminal according to claim 13, wherein the processor is further programmed to control the timer to stop timing if working frequencies which correspond to the timer and are obtained when timing of the timer expires successively are all the maximum frequency, and the number of times that the working frequencies are all the maximum frequency is just greater than a threshold of the number of periods in which the maximum frequency lasts.

17. The terminal according to claim 16, wherein the threshold of the number of the periods in which the maximum frequency lasts is:

(start CPU power consumption sensitive factor threshold×open core sampling space)/(usage threshold×frequency weight), wherein the frequency weight is a first weight; and wherein the number of times that the working frequencies are all the maximum frequency is just greater than a threshold of the number of periods in which the maximum frequency lasts is the number of times that the working frequencies are all the maximum frequency is the threshold of the number of the periods in which the maximum frequency lasts plus 1.

18. The terminal according to claim 1, wherein the first frequency is a frequency corresponding to an inflection point of a current-frequency curve.

19. The terminal according to claim 18, wherein in the current-frequency curve, a first slope is smaller than a second slope;

the first slope is a slope of a straight line formed by measurement points whose frequencies are lower than the frequency corresponding to the inflection point; and the second slope is a slope of a straight line formed by measurement points whose frequencies are higher than the frequency corresponding to the inflection point.

\* \* \* \* \*